United States Patent
Hishida et al.

(10) Patent No.: US 10,938,263 B2
(45) Date of Patent: Mar. 2, 2021

(54) CONNECTION STRUCTURE FOR COIL AND BUS BAR, AND MOTOR HAVING SAME

(71) Applicant: Panasonic Intellectual Property Management Co., Ltd., Osaka (JP)

(72) Inventors: Mitsuoki Hishida, Osaka (JP); Hirokazu Yamauchi, Osaka (JP); Yuichi Yoshikawa, Osaka (JP); Keiichiro Nukada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/475,723

(22) PCT Filed: Nov. 2, 2017

(86) PCT No.: PCT/JP2017/039708
§ 371 (c)(1),
(2) Date: Jul. 3, 2019

(87) PCT Pub. No.: WO2018/135087
PCT Pub. Date: Jul. 26, 2018

(65) Prior Publication Data
US 2019/0348886 A1 Nov. 14, 2019

(30) Foreign Application Priority Data
Jan. 18, 2017 (JP) .............................. JP2017-006961

(51) Int. Cl.
*H02K 3/52* (2006.01)
*H02K 3/02* (2006.01)
(Continued)

(52) U.S. Cl.
CPC ............... *H02K 3/522* (2013.01); *H02K 3/02* (2013.01); *H02K 3/18* (2013.01); *H02K 21/16* (2013.01);
(Continued)

(58) Field of Classification Search
CPC ............. H02K 3/50; H02K 11/20; H02K 5/12
(Continued)

(56) References Cited

U.S. PATENT DOCUMENTS

2014/0070646 A1* 3/2014 Isoda ...................... H02K 3/28
310/71
2015/0340919 A1* 11/2015 Murakami ............. H02K 5/225
310/71
2016/0336826 A1 11/2016 Ichikawa et al.

FOREIGN PATENT DOCUMENTS

| CN | 105814775 A | 7/2016 |
|---|---|---|
| DE | 102012212637 | 1/2014 |
| DE | 102014224393 A1 | 6/2016 |
| EP | 2874277 A2 | 5/2015 |
| JP | 2006-158044 A | 6/2006 |

(Continued)

OTHER PUBLICATIONS

Machine Translation JP2014036562 (Year: 2014).*
(Continued)

*Primary Examiner* — Jose A Gonzalez Quinones
(74) *Attorney, Agent, or Firm* — McDermott Will and Emery LLP

(57) ABSTRACT

The invention provides a connection structure between a coil and a bus bar attached to a stator of a motor, and the coil and the bus bar each include a lead part. At least one of the lead parts has a distal end provided with a corner cut away to be stepped to configure a stepped portion having a side surface extending substantially in parallel with a longitudinal direction of the lead part. The coil and the bus bar are connected (Continued)

to each other in a state where the side surface of the stepped portion of a first one of the lead parts is in contact with a second one of the lead parts.

11 Claims, 14 Drawing Sheets

(51) Int. Cl.
    *H02K 3/18*    (2006.01)
    *H02K 21/16*   (2006.01)

(52) U.S. Cl.
    CPC ..... *H02K 2203/06* (2013.01); *H02K 2203/09* (2013.01)

(58) Field of Classification Search
    USPC .......................................... 310/66, 71, 75 R
    See application file for complete search history.

(56) References Cited

FOREIGN PATENT DOCUMENTS

| | | | |
|---|---|---|---|
| JP | 2014-036562 | | 2/2014 |
| JP | 2014036562 A | * | 2/2014 |
| JP | 2015-035881 | | 2/2015 |
| JP | 2015035881 A | * | 2/2015 |
| JP | 2015231245 A | * | 12/2015 |

OTHER PUBLICATIONS

Machine Translation JP2015035881 (Year: 2915).*
The Extended European Search Report dated Jan. 24, 2020 for the related European Patent Application No. 17892257.1.
International Search Report of PCT application No. PCT/JP2017/039708 dated Jan. 16, 2018.
English Translation of Chinese Search Report dated Oct. 13, 2020 for the related Chinese Patent Application No. 201780083400.5.

* cited by examiner

CONNECTION STRUCTURE FOR COIL AND BUS BAR, AND MOTOR HAVING SAME

CROSS-REFERENCE TO RELATED APPLICATIONS

This application is a U.S. national stage application of the PCT International Application No. PCT/JP2017/039708 filed on Nov. 2, 2017, which claims the benefit of foreign priority of Japanese patent application 2017-006961 filed on Jan. 18, 2017, the contents all of which are incorporated herein by reference.

TECHNICAL FIELD

A technique disclosed herein relates to a connection structure between a coil and a bus bar attached to a stator of a motor, and a motor having the connection structure.

BACKGROUND ART

There have been increasing demands for motors as industrial motors and in-vehicle motors. Demanded in this situation are efficiency improvement and cost reduction of the motors.

There has been known, as a technique for motor efficiency improvement, increase in space factor of a coil disposed in a slot of a stator. Such increase in space factor of the coil leads to inhibition of loss due to current flowing to the coil upon motor drive.

There has been proposed, as a technique for increase in space factor of a coil, disposition of a cast coil made of a copper material in a slot (see PTL 1 or the like).

Current is typically supplied from a power source to a coil of a motor via a conductive member called a bus bar. For example, a three-phase motor having twelve slots is provided with a bus bar for collective supply of current to coils in the respective phases.

Typically, a coil is made of wound copper wire that has a circular section and is provided with an insulating coating, whereas a bus bar includes combined tabular members. In this case, the coil and the bus bar respectively have lead parts that are joined by fusing or the like to be connected to each other.

The coil and the bus bar are quite different in shape and width of joint portions, and are thus difficult to be stably fixed during joining. This complicates a joining process. Particularly, in a case where a plurality of coils is provided and is bundled, the coils are in contact with the bus bar at contact surfaces provided only on a periphery of the bundled coils. The bundled coils have a center not in contact with the bus bar. This configuration is likely to have complication due to difference in contact object and contact shape at different positions. This may cause defective connection between the coils and the bus bar.

A coil made of wound wire having a rectangular section, as disclosed in PTL 1, may be free from the above problem. This case may still have several problems. For example, in a case where space density at a connection point between the coil and a bus bar is increased due to relation between a size of a motor and a number of slots, it may become difficult to move a fusing nozzle for pressurization and heating to the connection point.

CITATION LIST

Patent Literature

PTL 1: Unexamined German Patent Publication No. 102012212637

SUMMARY OF THE INVENTION

Disclosed herein is a technique devised in view of such problems. It is an object of the present disclosure to provide a structure for stable connection between a coil and a bus bar of a motor.

In order to achieve this object, the technique disclosed herein achieves a connection structure at a joint between distal ends of lead parts of a coil and a bus bar by providing each of the distal ends with a stepped portion or by providing a first one of the distal ends with a protrusion and providing a second one of the distal ends with a recess.

Specifically, the present disclosure provides a connection structure between a coil and a bus bar attached to a stator of a motor, and the coil and the bus bar each include a lead part. At least one of the lead parts has a distal end provided with a corner cut away to be stepped to configure a stepped portion having a side surface extending substantially in parallel with a longitudinal direction of the lead part. The coil and the bus bar are connected to each other in a state where the side surface of the stepped portion of a first one of the lead parts is in contact with a second one of the lead parts.

The configuration enables sufficient pressurization of the lead parts upon bringing the side surface of the stepped portion of the first lead part into contact with the second lead part for connection between the coil and the bus bar, to achieve stable and reliable connection between the coil and the bus bar.

The present disclosure provides another connection structure between a coil and a bus bar attached to a stator of a motor, and the coil and the bus bar each include a lead part. A first one of the lead part of the coil and the lead part of the bus bar has a distal end provided with a protrusion extending in a longitudinal direction of the lead part, and a second one of the lead parts has a distal end provided with a recess to be fitted to the protrusion. The coil and the bus bar are connected to each other in a state where the protrusion is fitted to the recess.

This configuration enables application of force necessary for connection between the coil and the bus bar to side surfaces where the protrusion and the recess are in contact with each other. Furthermore, the coil and the bus bar can be connected to each other stably and reliably. Moreover, there is provided a plurality of contact surfaces stabilizing connection between the coil and the bus bar.

The present disclosure provides still another connection structure between a coil and a bus bar attached to a stator of a motor, and the coil and the bus bar each include a lead part. Each of the lead parts has a distal end provided with a wide portion including a base and a lateral projection from the base. The coil and the bus bar are connected to each other in a state where the wide portions are overlapped with each other with the projections being in contact with each other.

This configuration enables application of force necessary for connection between the coil and the bus bar to opposing surfaces of the wide portions where the coil and the bus bar are in contact with each other. The coil and the bus bar can thus be connected to each other stably and reliably. Furthermore, provision of joint surfaces distant from the base facilitates securing a space allowing insertion of a tool such as a fusing nozzle used for joining.

The present disclosure provides a motor including a cover case accommodating a shaft, a rotor provided in contact with an outer circumference of the shaft, and a stator disposed outside the rotor and constantly spaced apart from the rotor. The stator includes a substantially annular stator core, a plurality of teeth provided at equal intervals along an inner circumference of the stator core, slots each provided between the teeth, a coil attached to each of the teeth and disposed in a corresponding one of the slots, and a bus bar electrically connected to the coil. The coil and the bus bar have at least one connecting part having the connection structure.

This configuration achieves stable connection between the coil and the bus bar to embody the motor of high reliability with less defective connection.

The present disclosure achieves stable connection between the coil and the bus bar and embodies the motor of high reliability with less defective connection.

DESCRIPTION OF PREFERRED EMBODIMENTS

Exemplary embodiments of the present disclosure will be described in detail below with reference to the drawings. The following preferred exemplary embodiments are essentially described merely exemplarily, without intention of limiting the present disclosure, elements obtained by applying the present disclosure, or purposes of the present disclosure.

First Exemplary Embodiment (Structure of Motor)

Figure 1A:
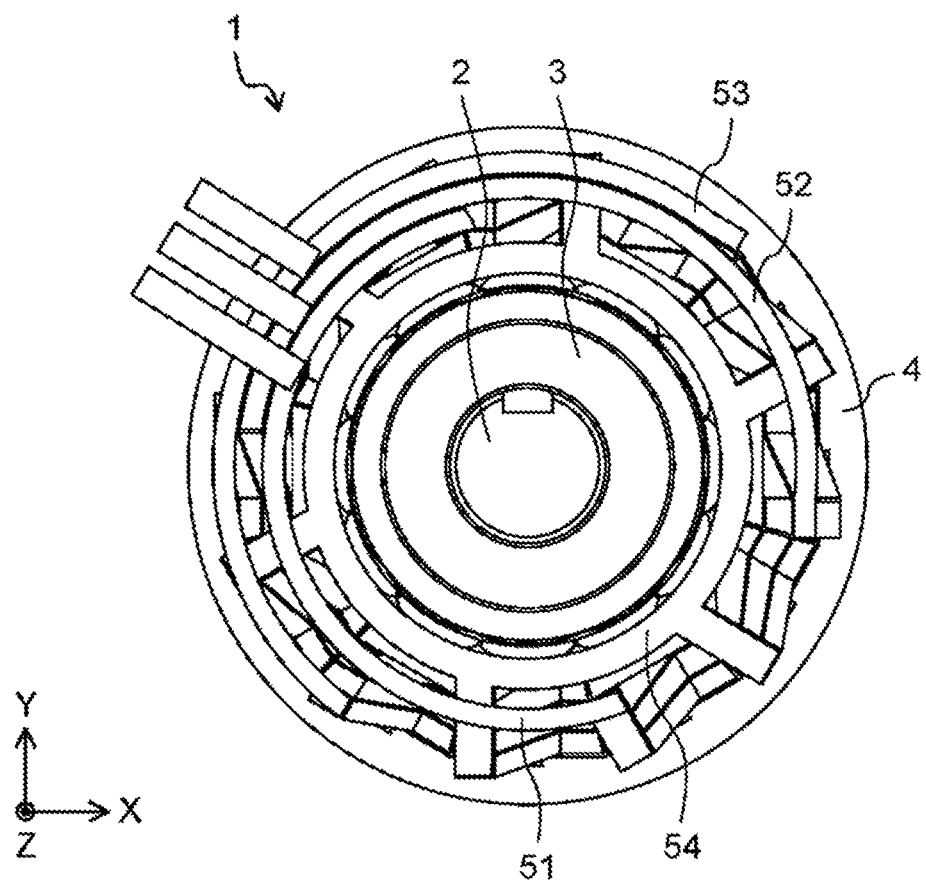
FIG. 1A is a top view of a motor according to a first exemplary embodiment.
Figure 1B:
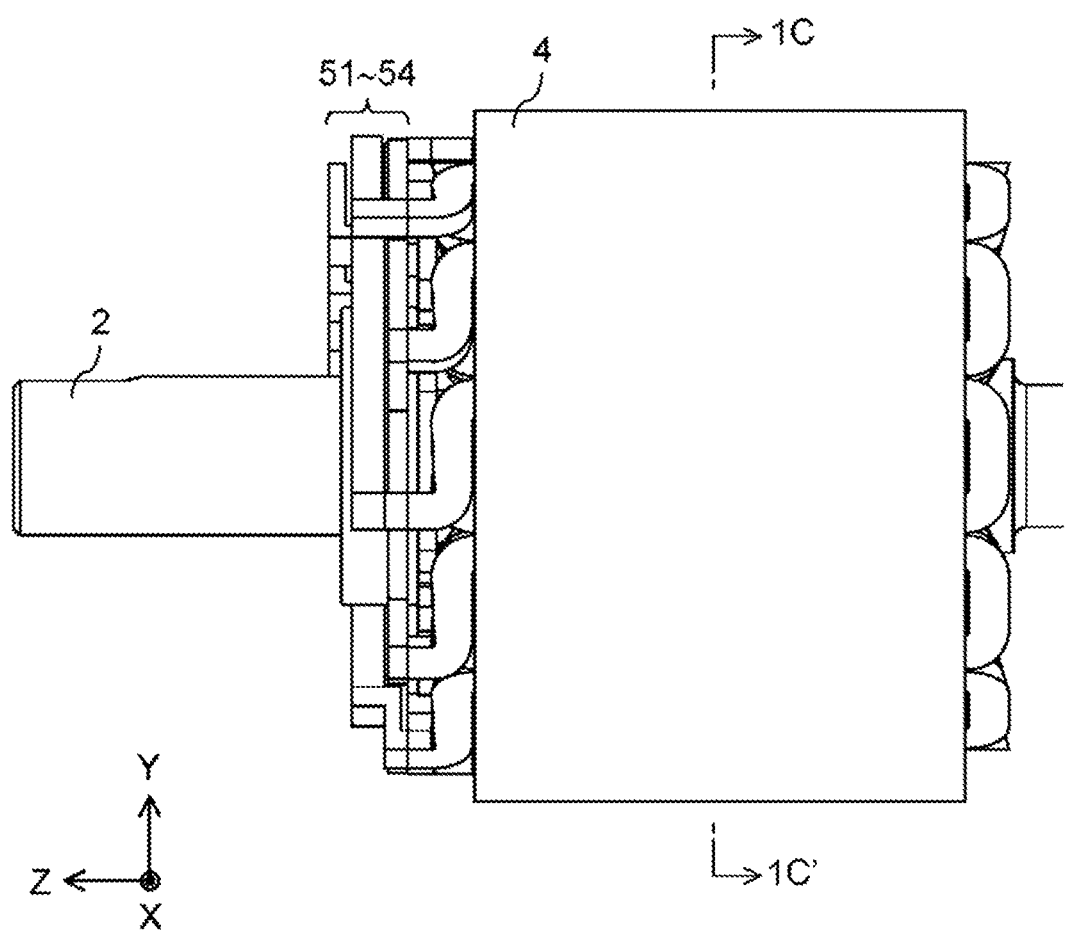
FIG. 1B is a side view of the motor according to the first exemplary embodiment.
Figure 1C:
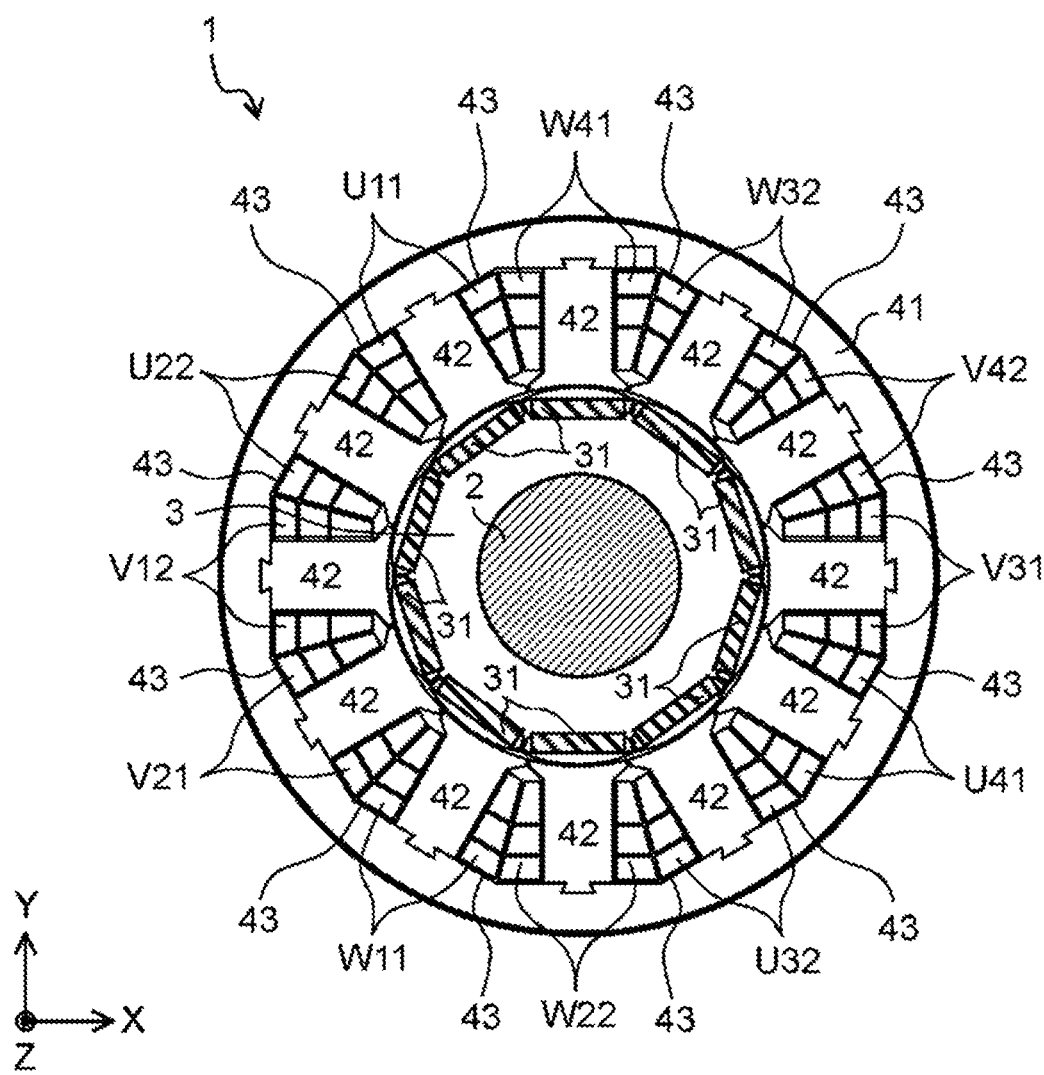
FIG. 1C is a sectional view taken along line 1C-1C' indicated in FIG. 1B.

FIG. 1A is a top view of a motor according to a first exemplary embodiment. FIG. 1B is a side view of the motor according to the first exemplary embodiment. FIG. 1C is a sectional view taken along line 1C-1C' indicated in FIG. 1B. FIG. 1C depicts a main part having a section hatched uniquely. Motor 1 includes rotor 3, shaft 2, stator 4, coils U11 to U41, V12 to V42, W11 to W41, and bus bars 51 to 54, which are accommodated in a cover case (not depicted).

The following description refers to a Z-axis direction that is parallel to a longitudinal direction (vertical to a drawing sheet) of shaft 2 as depicted in FIG. 1A. The following description also refers to an X-axis direction and a Y-axis direction that are perpendicular to the Z-axis direction (parallel to the drawing sheet). The X-axis direction is perpendicular to the Y-axis direction.

The expression "integration" or "integrated" means a state of a single object including a plurality of components mechanically connected by means of bolting, caulking, or the like, a single object including components electrically connected by means of material joining such as covalent bonding, ionic bonding, or metallic bonding, or an object including all components electrically connected by means of material joining such as melting.

Rotor 3 is in contact with an outer circumference of shaft 2. Rotor 3 includes magnets 31 facing stator 4 and having N-poles and S-poles alternately disposed along the outer circumference of shaft 2. The present exemplary embodiment adopts neodymium magnets as magnets 31 included in rotor 3, although magnets 31 may be modified appropriately in accordance with motor output or the like in terms of material, shape, and quality of the material.

Stator 4 includes stator core 41 having a substantially annular shape, a plurality of teeth 42 provided at equal intervals along an inner circumference of stator core 41, and slots 43 each provided between adjacent teeth 42. Stator 4 is disposed outside rotor 3 so as to be constantly spaced apart from rotor 3 in the Z-axis direction.

Stator core 41 is prepared by stacking electromagnetic steel sheets containing silicon or the like and subsequently punching the electromagnetic steel sheets.

Rotor 3 according to the present exemplary embodiment has totally ten magnetic poles including five N-poles and five S-poles each facing stator 4. There are provided twelve slots 43. The present disclosure should not be particularly limited to the number of magnetic poles of rotor 3 or the number of slots 43, but is applicable to any combination of a different number of magnetic poles and a different number of slots.

Stator 4 has twelve coils U11 to U41, V12 to V42, W11 to W41. Each of coils U11 to U41, V12 to V42, W11 to W41 is attached to a corresponding one of teeth 42, and is disposed in a corresponding one of slots 43 when viewed in the Z-axis direction. Coils U11 to U41, V12 to V42, W11 to W41 thus have concentrated winding relatively to teeth 42. Furthermore, coils U11 to U41, V12 to V42, W11 to W41 are integrated with or connected to bus bars 51, 52, 53, respectively.

Reference mark UPQ, VPQ, WPQ denoting a coil includes a first letter indicating a phase (a U-phase, a V-phase, or a W-phase in the present exemplary embodiment) of motor 1. A second letter indicates a coil array order in the corresponding phase. A third letter indicates a coil winding direction, and the present exemplary embodiment provides 1 indicating a clockwise direction and 2 indicating a counterclockwise direction. Coil U11 accordingly corresponds to a coil having a first coil array order in the U-phase and a clockwise winding direction. Coil V42 corresponds to a coil having a fourth coil array order in the V-phase and a counterclockwise winding direction. The expression "clockwise" indicates right-handed rotation and the expression "counterclockwise" indicates left-handed rotation when viewed from a center of motor 1.

Strictly, coils U11, U41 are coils in the U-phase, and coils U22, U32 are coils in a U-bar phase (generating a magnetic field opposite to a magnetic field of a U-phase coil). The following description will generically call these coils as U-phase coils unless otherwise specified. Similarly, coils V12 to V42 and coils W11 to W41 will be generically called V-phase coils and W-phase coils, respectively.

Figure 5:
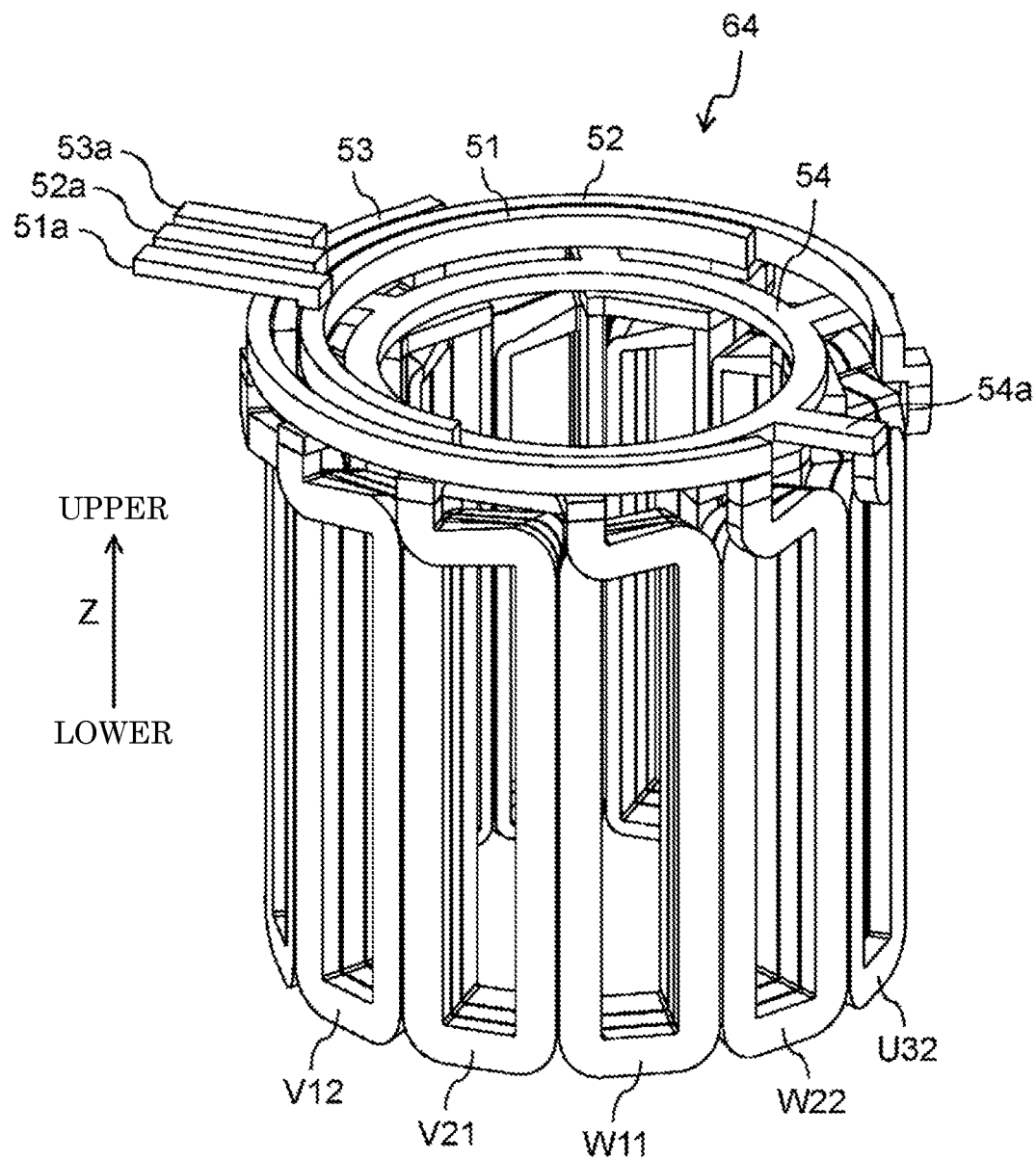
FIG. 5 is a perspective view of a U, V, and W-phase coil molding and the bus bars combined together in the motor according to the first exemplary embodiment.

FIG. 5 is a perspective view of U, V, and W-phase coil molding 64 and the bus bars combined together in the motor according to the first exemplary embodiment. As depicted in FIG. 5, coil molding 64 having the respective phases can be integrated with bus bars 51 to 54. However, this may lead to complication in shape and difficulty in provision of an integral structure including the coils and the bus bars. This may also lead to decrease in assembly aligning margin during assembling coils V12 to W41 to stator 4.

Unless otherwise specified, the following description will thus assume that U-phase coils include coils U11 to U41 integrated with or connected to bus bars 51, 54 to configure coil molding 61 (see FIG. 2), V-phase coils include two types of coils, namely, a set of adjacent coils V12, V21 integrated to configure coil molding 62a (see FIG. 3) and another set of adjacent coils V31, V42 integrated to configure coil molding 62b (see FIG. 3), and W-phase coils include two types of integrated coils similarly to the V-phase coils. Coil molding 64 depicted in FIG. 5 includes aligned coil moldings 61 to 63 in the U, V, and W phases.

Coil groups and the bus bars form integral structures having variations not limited to the above, but can be obviously modified appropriately in accordance with specifications of motor 1, capacity of assembly equipment for stator 4 or the coils, and the like.

(Connector Between Coils and Bus Bars)

Figure 2:
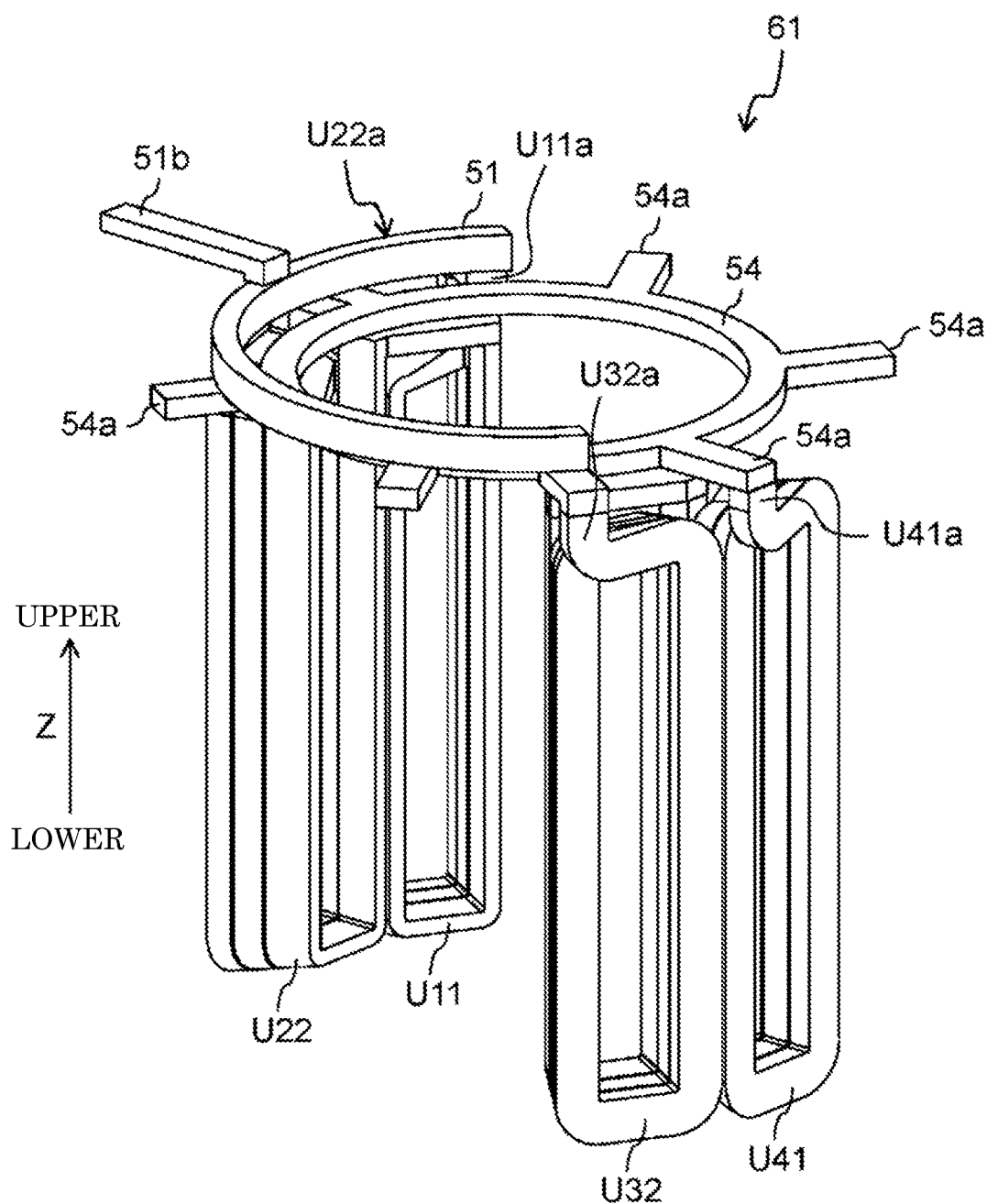
FIG. 2 is a perspective view of a U-phase coil molding including coils and bus bars integrated in the motor according to the first exemplary embodiment.

FIG. 2 is a perspective view of a U-phase coil molding including the coils and the bus bars integrated in the motor according to the first exemplary embodiment. As depicted in FIG. 2, coils U11 to U41 and bus bars 51, 54 are integrated to configure coil molding 61. As depicted in FIG. 2, the following description may refer to a first end, provided with bus bar 51, of coil molding 61 as an "upper" end and a second opposite end as a "lower" end in the Z-axis direction.

Bus bar 51 in coil molding 61 has a substantially semi-annular shape when viewed in the Z-axis direction. Bus bar 51 has ends respectively integrated with lead parts U11a, U32a of coils U11, U32. Bus bar 51 has lead part 51b electrically connected to a power source (in the U-phase; not depicted).

Bus bar 54 is a tabular member having a substantially annular shape when viewed in the Z-axis direction, and has a plurality of lead parts 54a. Coils U22, U41 respectively have lead parts U22a, U41a integrated with lead parts 54a, 54a of bus bar 54.

A set of coils U11, U22 are directly integrated with each other without bus bars 51, 54 being interposed. Another set of coils U32, U41 are directly integrated with each other similarly to coils U11, U22. When current flows to coils U11 to U41, coil U11 and coil U22 having opposite winding directions generate magnetic flux opposite to each other. Coil U32 and coil U41 similarly generate magnetic flux opposite to each other.

Coils U11 to U41 and bus bars 51, 54 are each made of a copper material. Coils U11 to U41 are each made of copper wire having a rectangular section.

Figure 3:
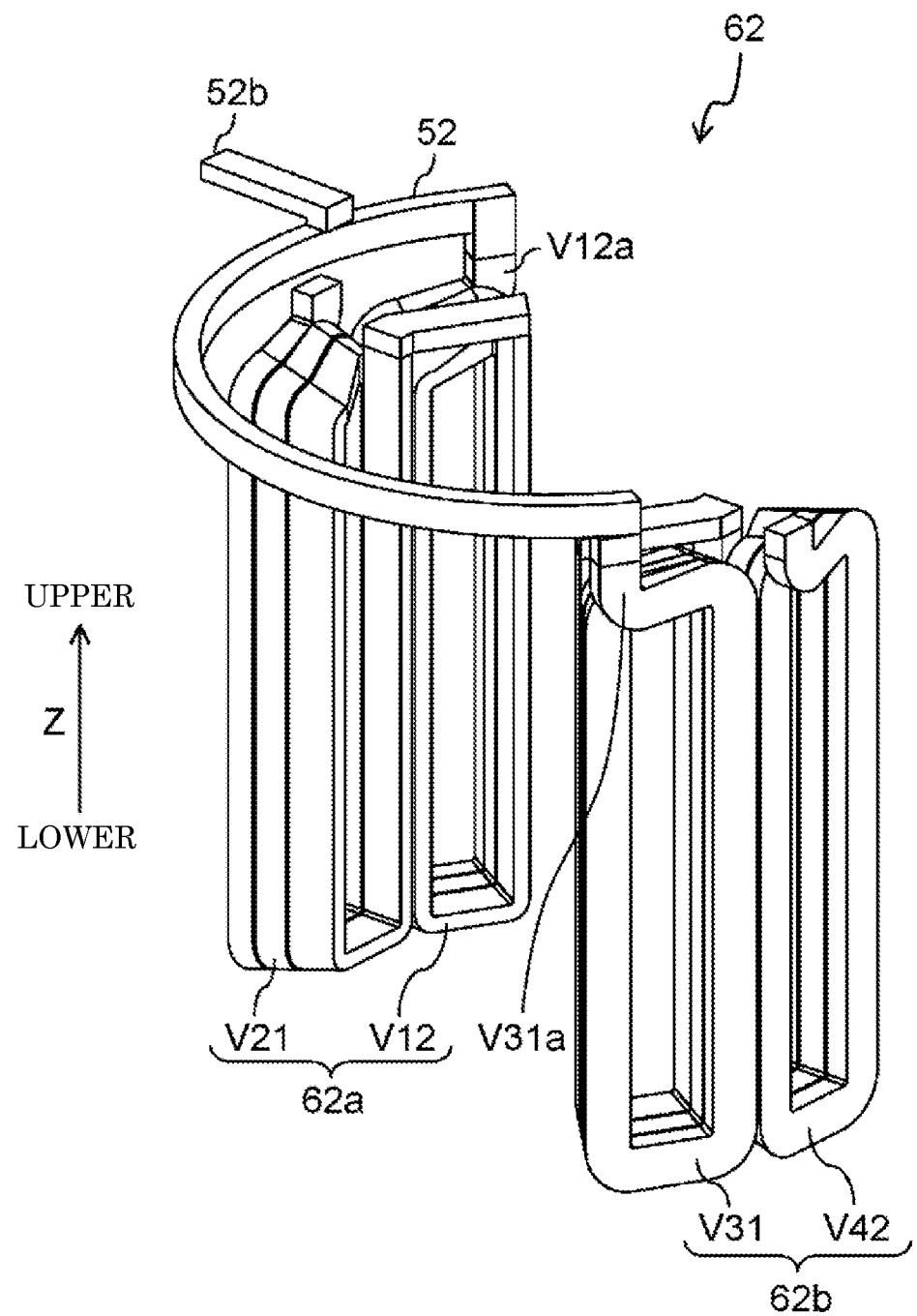
FIG. 3 is a perspective view of a connector between a V-phase coil molding and a bus bar in the motor according to the first exemplary embodiment.

FIG. 3 is a perspective view of a connector (coil molding 62) between V-phase coil moldings 62a, 62b and bus bar 52 in the motor according to the first exemplary embodiment. As depicted in FIG. 3, bus bar 52 is a tabular member having a substantially semiannular shape when viewed in the Z-axis direction. Bus bar 52 has ends respectively connected to lead parts V12a, V31a of coils V12, V31. Bus bar 52 has lead part 52b electrically connected to a power source (in the V-phase; not depicted). Among four V-phase coils, the set of adjacent coils V12, V21 are directly integrated with each other similarly to coils U11, U22 and the like. Similarly, the other set of adjacent coils V31, V42 are directly integrated with each other.

Coils V12 to V42 and bus bar 52 are each made of a copper material. Coils V12 to V42 are each made of copper wire having a rectangular section.

Figure 4:
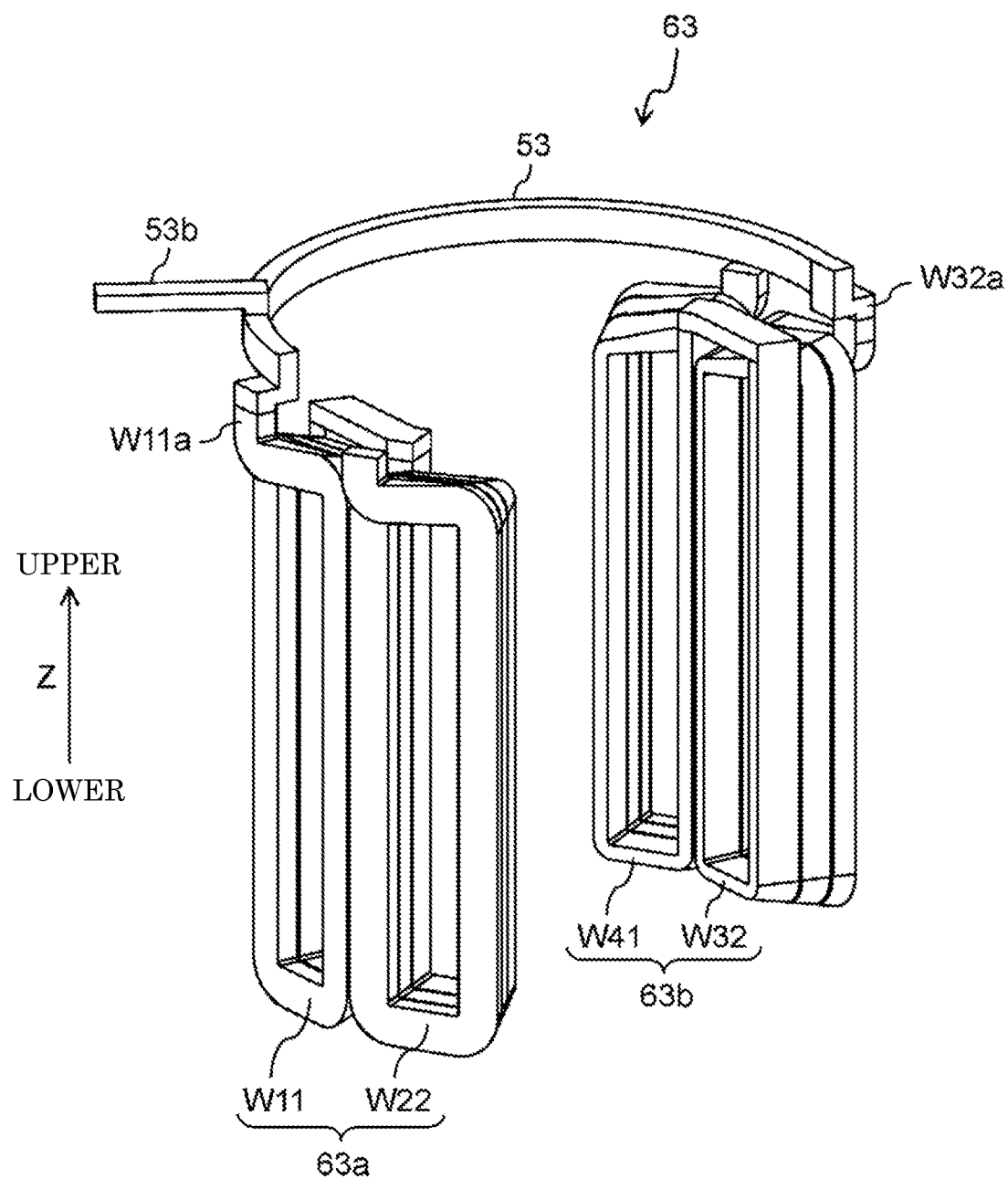
FIG. 4 is a perspective view of a connector between a W-phase coil molding and a bus bar in the motor according to the first exemplary embodiment.

FIG. 4 is a perspective view of a connector (coil molding 63) between W-phase coil moldings 63a, 63b and bus bar 53 in the motor according to the first exemplary embodiment. As depicted in FIG. 4, bus bar 53 is a tabular member having a substantially semiannular shape when viewed in the Z-axis direction. Bus bar 53 has ends respectively connected to lead parts W11a, W32a of coils W11, W32. Bus bar 53 has lead part 53b electrically connected to a power source (in the W-phase; not depicted). Among four W-phase coils, a set of adjacent coils W11, W22 are integrated with each other similarly to coils U11, U22 and the like. Another set of adjacent coils W32, W41 are similarly integrated with each other.

Coils W11 to W41 and bus bar 53 are each made of a copper material. Coils W11 to W41 are each made of copper wire having a rectangular section.

FIG. 5 is a perspective view of a U, V, and W-phase coil molding and the bus bars combined together in the motor according to the first exemplary embodiment. Coil molding 64 includes aligned coil moldings 61 to 63 in the respective phases. Bus bar 54 is a tabular member having a substantially annular shape when viewed in the Z-axis direction. Bus bar 54 has the plurality of lead parts 54a. The lead parts (not depicted) of coils U22, U41, V21, V42, W22, W41 are integrated with or connected to lead parts 54a of bus bar 54. Bus bar 54 has potential corresponding to neutral point potential of motor 1.

Bus bars 51 to 54 have lead parts 51a to 54a functioning as conductive members each having a rectangular section and extending from bus bars 51 to 54, respectively. The lead parts each have a distal end to be described later having a section not limited to a rectangular shape.

V-phase coils V12 to V42 and bus bars 52, 54, as well as W-phase coils W11 to W41 and bus bars 53, 54, are connected through joining by fusing.

The distal ends of the lead parts of coils V12 to W41 and the distal ends of the lead parts of bus bars 52 to 54 are formed into the following shapes for reliable joining between these components.

(Connection Structure Between Coil and Bus Bar)

Figure 6:
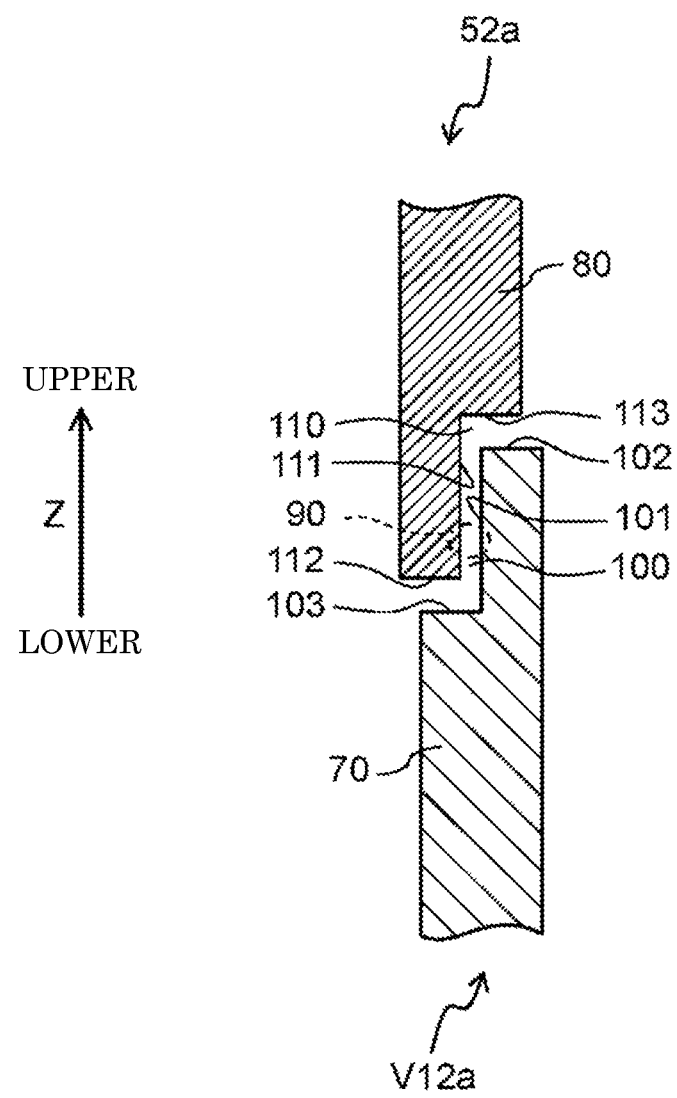
FIG. 6 is a schematic sectional view of a connection structure between the coil and the bus bar in the motor according to the first exemplary embodiment.
Figure 7:
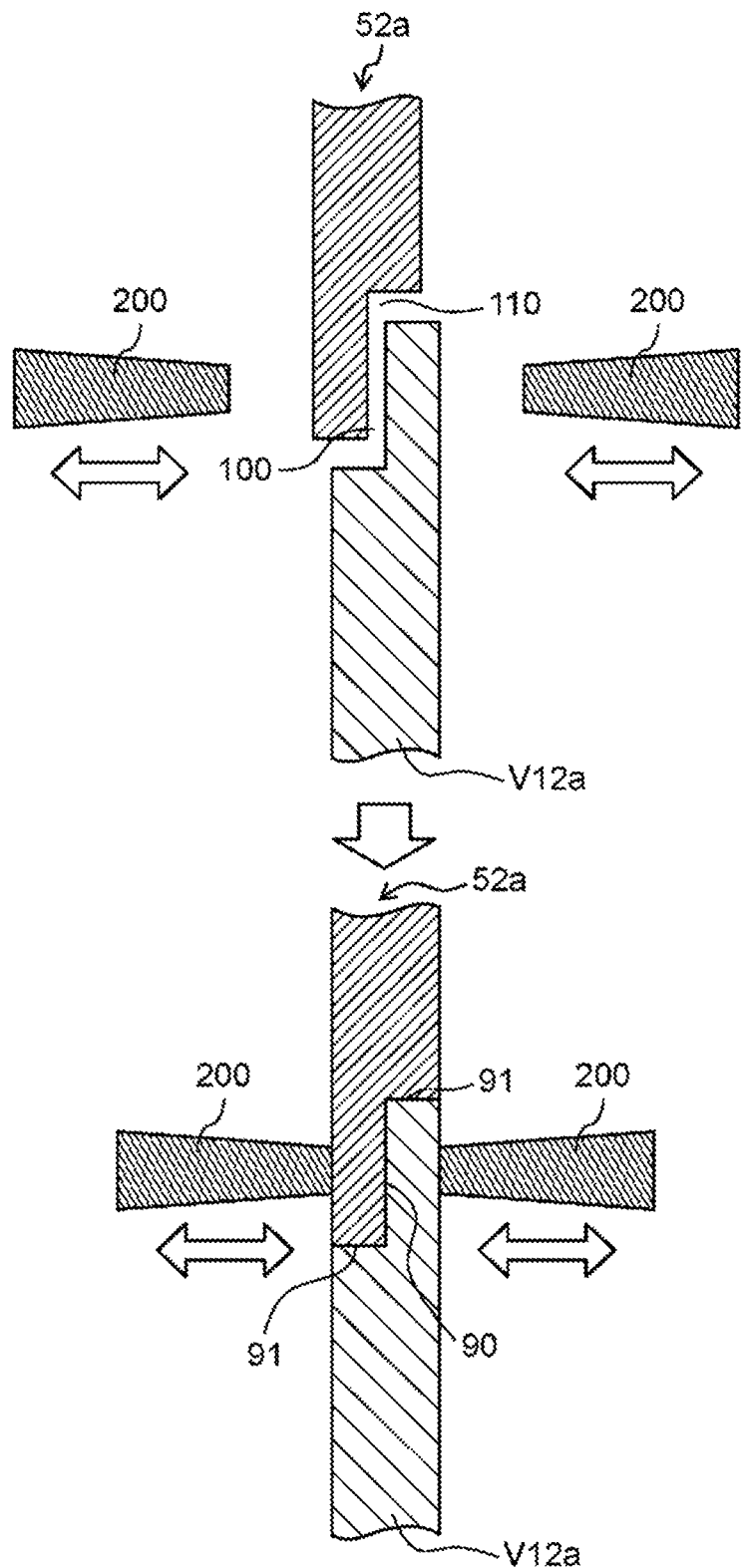
FIG. 7 is an explanatory view on a method of connecting the coil and the bus bar in the motor according to the first exemplary embodiment.

FIG. 6 is a schematic sectional view of a connection structure between one of the coils and one of the bus bars in the motor according to the first exemplary embodiment. FIG. 7 is an explanatory view on a method of connecting the coil and the bus bar in the motor according to the first exemplary embodiment. A connection structure between lead part V12a of coil V12 and lead part 52a at an end of bus bar 52 will be exemplarily described herein. Lead parts V12a, 52a have bases 70, 80 provided at distal ends with stepped portions 100, 110, respectively. Stepped portions 100, 110 are each obtained by cutting away a corner of a distal end to be stepped. Stepped portions 100, 110 have side surfaces 101, 111 that are made in contact with and joined to each other to configure joint surfaces 90.

side surfaces 101, 111 are parallel to a longitudinal direction (in the Z-axis direction in the present exemplary embodiment) of lead parts V12a, 52a. Lead parts V12a, 52a have distal end surfaces 102, 112, and stepped portions 100, 110 have bottom surfaces 103, 113. Distal end surfaces 102, 112 and bottom surfaces 103, 113 are provided continuously to side surfaces 101, 111, and are perpendicular to the longitudinal direction of lead parts V12a, 52a.

Distal end surface 112 provided at bus bar 52 is in contact with bottom surface 103 of stepped portion 100 provided at coil V12. Bottom surface 113 of stepped portion 110 provided at bus bar 52 is in contact with distal end surface 102 provided at coil V12. These contact surfaces configure support surfaces 91. Support surfaces 91 are not necessarily joined.

The expressions "parallel" and "perpendicular" means "parallel" and "perpendicular" inclusive of processing tolerance of coil V12 or bus bar 52, erection tolerance of coil V12 and bus bar 52, and erection tolerance of coil V12 or bus bar 52 to stator 4. The same applies to the following description.

Bus bar 52 and coil V12 are connected to each other by initially engaging stepped portion 110 provided at bus bar 52 with stepped portion 100 provided at coil V12 to bring side surfaces 101, 111 of stepped portions 100, 110 into contact with each other. Two fusing nozzles 200 are moved in a direction perpendicular to the longitudinal direction of lead parts V12a, 52a to interpose connecting parts between lead parts V12a, 52a so as to bring the connecting parts into contact with each other and pressurize the same.

Fusing nozzles 200 are energized to heat the connecting parts between lead parts V12a, 52a to join side surfaces 101, 111.

As described above, the present exemplary embodiment enables application, with no loss, of force from fusing nozzles 200 to side surfaces 101, 111 provided perpendicularly to moving directions of fusing nozzles 200 to achieve reliable joining between contact surfaces of side surfaces 101, 111. Coil V12 and bus bar 52 can thus be connected to each other stably and reliably with less defective connection.

Distal end surface 112 provided at bus bar 52 and bottom surface 103 of stepped portion 100 provided at coil V12 are made in contact with each other to cause interactive supporting force between bus bar 52 and coil V12 for higher mechanical strength at the connecting part between bus bar 52 and coil V12.

Motor 1 often generates vibration of respective members due to rotation. Low mechanical strength at a connecting part between members may lead to defective connection due to long-term use of motor 1. The present exemplary embodiment provides support surfaces 91 at the connecting part between coil V12 and bus bar 52 to achieve higher mechanical strength at the connecting part and enhanced reliability.

Coil V12 is made of copper wire having a rectangular section, so that lead part V12a excluding stepped portion 100 also has a rectangular section. Lead part 52a of bus bar 52, excluding stepped portion 110, also has a rectangular section. Stepped portions 100, 110 provided at coil V12 and bus bar 52 can thus be easily engaged with each other. Furthermore, side surfaces 101, 111 can be made in parallel with each other to cause the contact surfaces not to have any gap.

As depicted in FIG. 3 and FIG. 4, coils V12 to W41 and bus bars 52 to 54 are connected at a plurality of points. Some of the connections are positioned at equal height when viewed in the Z-axis direction. Actual connecting parts may not be positioned at equal height due to processing tolerance of the lead parts or the stepped portions, erection tolerance of coils V12 to W41 attached to stator 4, or the like. In such a case, at least one of distal end surface 112 of bus bar 52 with bottom surface 103 of stepped portion 100, and bottom surface 113 of stepped portion 110 with distal end surface 102 of lead part V12a may not be necessarily in contact. Distal end surface 112 of bus bar 52 and bottom surface 103 of stepped portion 100 may interpose a predetermined gap, and bottom surface 113 of stepped portion 110 and distal end surface 102 of lead part V12a may interpose a predetermined gap. The same applies to connecting parts between the remaining coils and bus bars.

As described above, the connection structure between a coil and a bus bar according to the present exemplary embodiment is applied to the coil and the bus bar attached to stator 4 of motor 1, and the coil and the bus bar have lead parts V12a and 52a, respectively. The distal end of the at least one lead part V12a has a corner cut away to be stepped so as to provide stepped portion 100 having side surface 101 extending substantially in parallel with the longitudinal direction of lead part V12a. The coil and the bus bar are connected to each other in the state where side surface 101 of stepped portion 100 at first lead part V12a is in contact with second lead part 52a.

The configuration enables sufficient pressurization of the lead parts upon bringing side surface 101 of the stepped portion of first lead part V12a into contact with second lead part 52a for connection between the coil and the bus bar, to achieve stable and reliable connection between the coil and the bus bar.

The distal ends of lead parts V12a, 52a may have corners cut away to be stepped so as to provide stepped portions 100, 110 having side surfaces 101, 111 extending substantially in parallel with the longitudinal direction of the lead parts, respectively. The coil and the bus bar may be connected to each other in the state where side surfaces 101, 111 of stepped portions 100, 110 are in contact with each other.

Lead parts V12a, 52a may have bottom surfaces 103, 113 provided continuously to side surfaces 101, 111 in stepped portions 100, 110 and distal end surfaces 102, 112 of portions other than the stepped portions at the distal ends, respectively. Bottom surfaces 103, 113 and distal end surfaces 102, 112 may be provided substantially perpendicularly to the longitudinal direction of lead part V12a, 52a.

Distal end surface 102 of first lead part V12a and bottom surface 113 of second lead part 52a may interpose a predetermined gap.

The coil may include wire of a metal selected from copper, aluminum, zinc, magnesium, brass, iron, and steel use stainless (SUS) and having a rectangular section, and lead part V12a of the coil may configure part of the wire. The bus bar may be a tabular member, and lead part 52a of the bus bar may be a conductive member having a rectangular section and extending from the tabular member.

Motor 1 according to the present exemplary embodiment includes the cover case accommodating shaft 2, rotor 3 provided in contact with the outer circumference of shaft 2, and stator 4 disposed outside rotor 3 so as to be constantly spaced apart from rotor 3. Stator 4 includes stator core 41 having a substantially annular shape, the plurality of teeth 42 provided at equal intervals along the inner circumference of stator core 41, slots 43 each provided between adjacent teeth 42, the coils attached to teeth 42 and disposed in slots 43, and the bus bars electrically connected to the coils. At least one of the connecting parts between the coils and the bus bars has the connection structure described above.

This configuration achieves stable connection between the coil and the bus bar to embody the motor of high reliability with less defective connection.

Modification Example 1

Figure 8A:
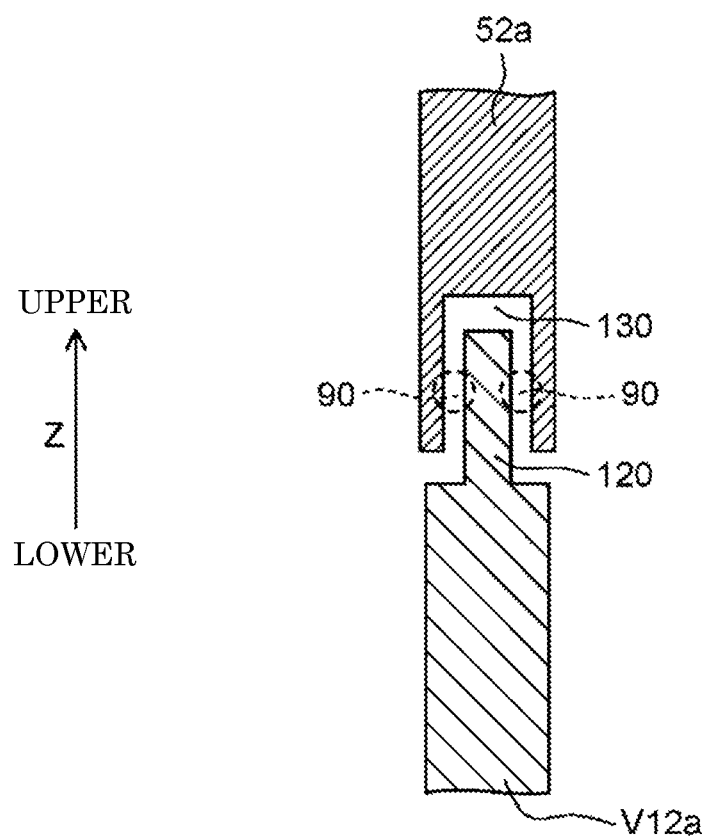
FIG. 8A is a schematic sectional view of a connection structure between a coil and a bus bar in a motor according to a modification example 1.
Figure 8B:
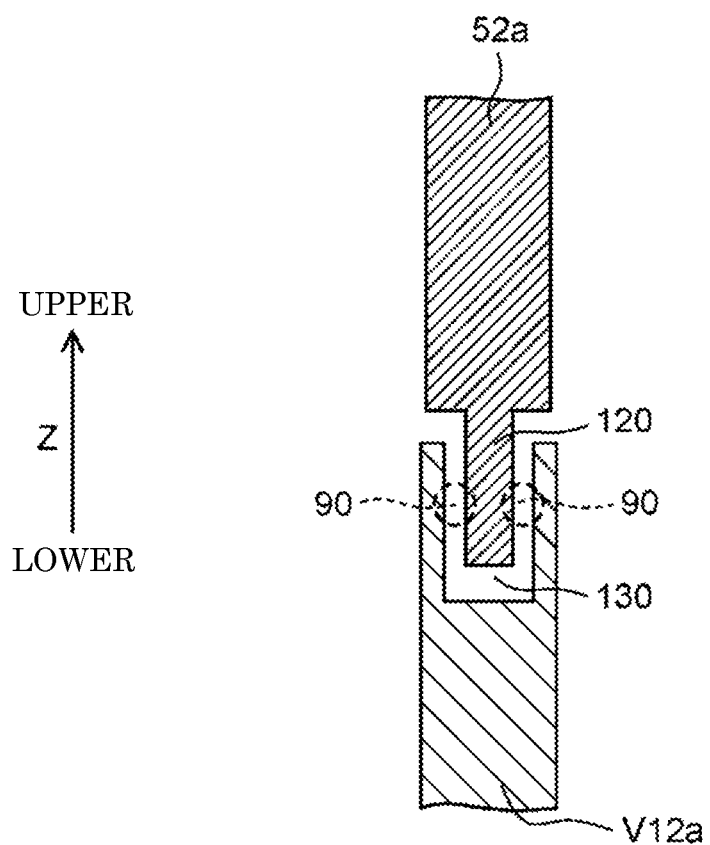
FIG. 8B is a schematic sectional view of another exemplary connection structure between the coil and the bus bar in the motor according to the modification example 1.
Figure 8C:
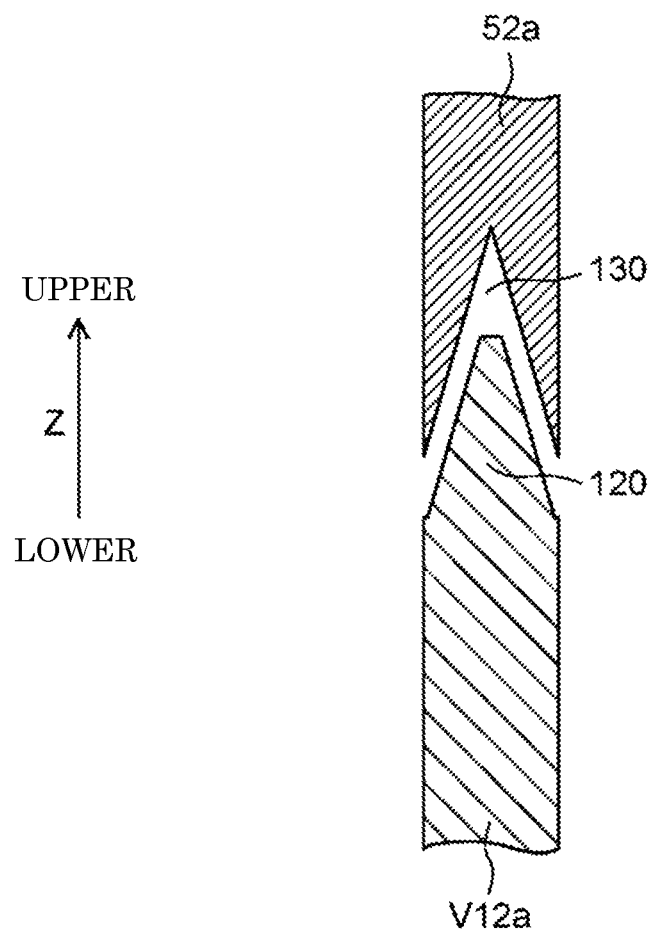
FIG. 8C is a schematic sectional view of still another exemplary connection structure between the coil and the bus bar in the motor according to the modification example 1.

FIG. 8A is a schematic sectional view of a connection structure between a coil and a bus bar in a motor according to a modification example 1. FIG. 8B is a schematic sectional view of another exemplary connection structure between the coil and the bus bar in the motor according to the modification example 1. FIG. 8C is a schematic sectional view of still another exemplary connection structure between the coil and the bus bar in the motor according to the modification example 1. As depicted in FIG. 8A, the distal end of lead part V12a has protrusion 120. The distal end of lead part 52a has recess 130. Protrusion 120 is fitted to recess 130, and side surfaces of protrusion 120 are joined to inner surfaces of recess 130. This configuration also achieves the effect described above. This configuration has a plurality of joint surfaces 90 to further stabilize connection between coil V12 and bus bar 52 in comparison to the structure depicted in FIG. 5.

The side surfaces of protrusion 120 and the inner surfaces of recess 130 are parallel to the longitudinal direction of lead part V12a, 52a. Protrusion 120 has a distal end and recess 130 has a bottom, and the distal end and the bottom are perpendicular to the longitudinal direction of lead part V12a, 52a.

Alternatively, protrusion 120 may be provided at the distal end of lead part 52a and recess 130 may be provided at the distal end of lead part V12a as depicted in FIG. 8B. This configuration achieves an effect similar to the effect of the structure depicted in FIG. 8A. Still alternatively, each of protrusion 120 and recess 130 may have a triangular section as depicted in FIG. 8C. The distal ends of protrusion 120 and recess 130 may be modified in shape appropriately in accordance with processing tolerance of lead parts V12a, 52a, mechanical stability between protrusion 120 and recess 130 fitted to each other, or the like. Preferably, protrusion 120 extends in the longitudinal direction of lead part V12a or 52a and has a prism shape having n corners (n is a natural number more than or equal to three), and recess 130 has a shape to be fitted to protrusion 120. Protrusion 120 thus shaped reliably provides a plurality of joint surfaces 90 to further stabilize connection between coil V12 and bus bar 52.

In each of the structures depicted in FIG. 8A to FIG. 8C, the distal end of protrusion 120 and the bottom of recess 130 may not necessarily be in contact with each other. The distal end of protrusion 120 and the bottom of recess 130 being in contact with each other provide support surfaces 91 as depicted in FIG. 7 to achieve higher mechanical strength at the connecting parts. However, the distal end of protrusion 120 and the bottom of recess 130 may interpose a predetermined gap as described above in a case where the connecting parts have varied height.

As described above, the connection structure between the coil and the bus bar according to the modification example 1 is applied to a coil and a bus bar attached to a stator of a motor, and the coil and the bus bar have lead parts V12a, 52a, respectively. The distal end of a first one of lead part V12a of the coil and lead part 52a of the bus bar is provided with protrusion 120 extending in the longitudinal direction of lead part V12a, and the distal end of a second one of the lead parts is provided with recess 130 to be fitted to protrusion 120. The coil and the bus bar are connected to each other in the state where protrusion 120 is fitted to recess 130.

This configuration enables application of force necessary for connection between the coil and the bus bar to the side surfaces where protrusion 120 and recess 130 are in contact with each other. Furthermore, the coil and the bus bar can be connected to each other stably and reliably. Moreover, there is provided a plurality of contact surfaces stabilizing connection between the coil and the bus bar.

The protrusion or the recess may alternatively have a prism shape having n corners (n is a natural number more than or equal to three) and extending in the longitudinal direction of lead parts V12a, 52a of the coil and the bus bar.

The side surfaces of protrusion 120 and the inner surfaces of recess 130 may be provided in parallel with the longitudinal direction of lead parts 52a, V12a. The coil and the bus bar may be connected to each other in the state where the side surfaces of protrusion 120 and the inner surfaces of recess 130 are in contact with each other.

The distal end of protrusion 120 and the bottom of the recess may interpose a predetermined gap.

Modification Example 2

Figure 9A:
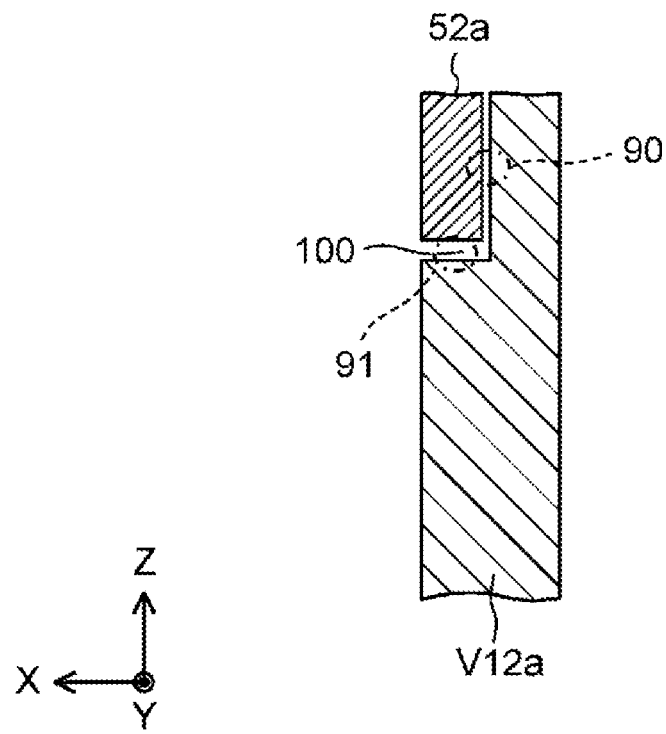
FIG. 9A is a schematic sectional view of a connection structure between a coil and a bus bar in a motor according to a modification example 2.
Figure 9B:
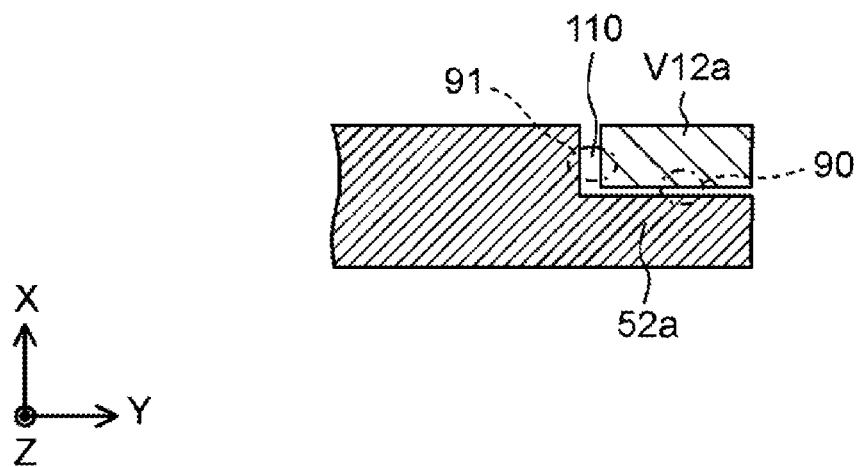
FIG. 9B is a schematic sectional view of another connection structure between the coil and the bus bar in the motor according to the modification example 2.

FIG. 9A and FIG. 9B are schematic sectional views of a connection structure between a coil and a bus bar in a motor according to a modification example 2. These figures depict a single connecting part viewed in different directions.

The above description refers to the case where the longitudinal direction of lead part V12a of coil V12 and the longitudinal direction of lead part 52a of bus bar 52 are parallel to each other (in the Z-axis direction).

Depending on design of motor 1, coil V12 and bus bar 52 may be connected with the lead parts being crossing each other, for example, in a state where two lead parts V12a, 52a are perpendicular to each other.

Also in such a case, provision of stepped portions 100, 110 at the distal ends of the lead parts as depicted in FIG. 9A and FIG. 9B achieves an effect similar to the effect of the structure according to the first exemplary embodiment.

The modification example 2 exhibits improvement in mechanical strength by support surfaces 91 smaller than the improvement achieved by the structure depicted in FIG. 6. However, the modification example 2 enables application of force from fusing nozzles 200 to joint surfaces 90 with no loss. This achieves reliable joint between coil V12 and bus bar 52.

Second Exemplary Embodiment

Figure 10:
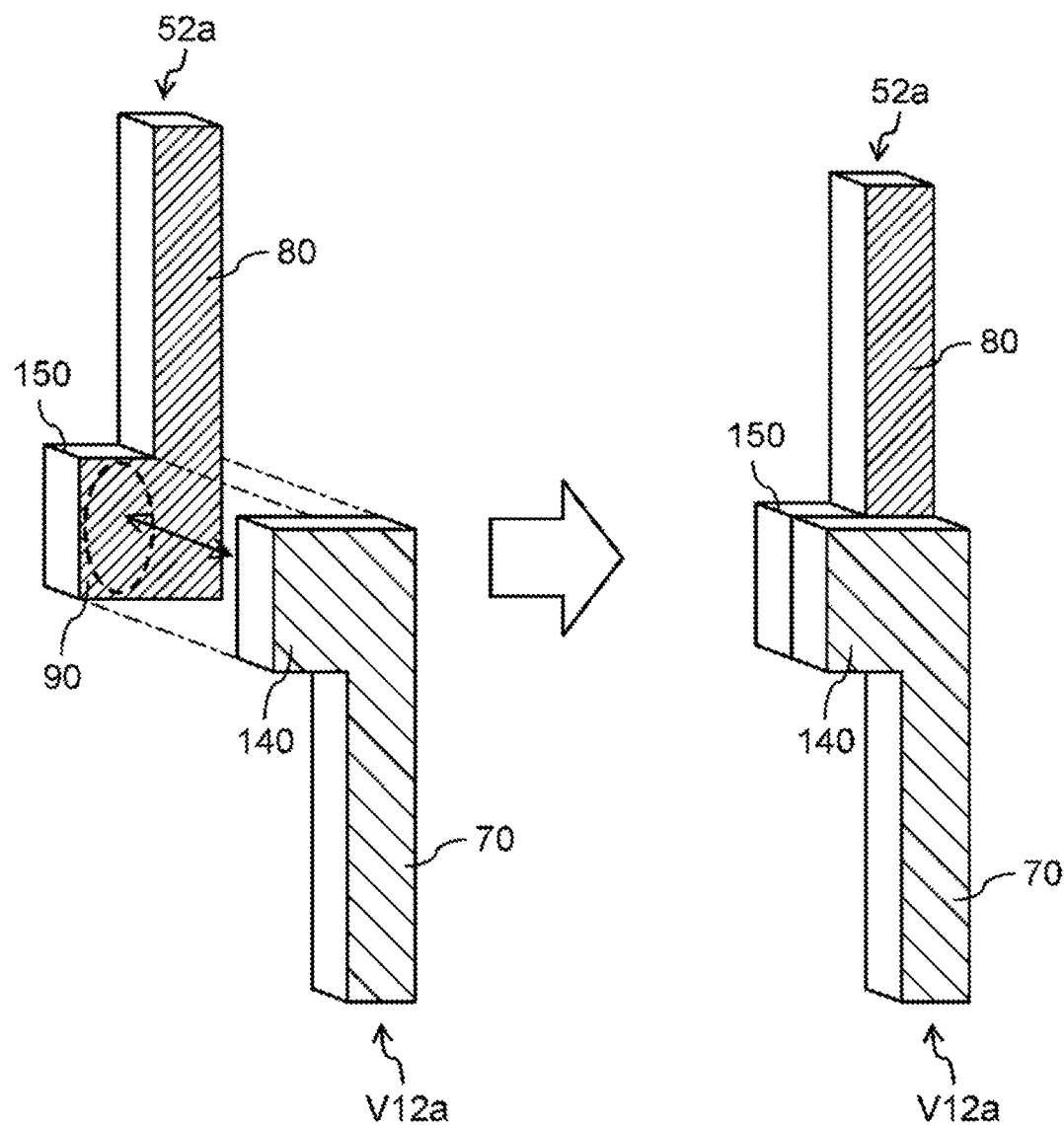
FIG. 10 is an explanatory view on a method of connecting a coil and a bus bar in a motor according to a second exemplary embodiment.

FIG. 10 is an explanatory view on a method of connecting a coil and a bus bar in a motor according to a second exemplary embodiment.

The present exemplary embodiment provides a configuration that is different from the configuration according to the first exemplary embodiment in the position of joint surfaces 90.

For example, the structure depicted in FIGS. 6 and 7 includes joint surfaces 90 provided in a region where bases 70, 80 of lead parts V12a, 52a are overlapped with each other.

FIG. 10 depicts a structure according to the present exemplary embodiment, including lead parts V12a, 52a having the distal ends provided with wide portions 140, 150 in place of stepped portions 100, 110. Joint surfaces 90 are provided at wide portions 140, 150, in portions where bases 70, 80 are not overlapped with each other, that is, portions laterally projecting from bases 70, 80.

More detailed description will be made to the method of connecting the coil and the bus bar in the motor according to the present exemplary embodiment.

In a state where wide portion 150 provided at bus bar 52 and wide portion 140 provided at coil V12 are disposed opposite to each other, wide portions 140, 150 are brought into contact with each other on opposing surfaces. Two fusing nozzles (not depicted) are moved in a direction perpendicular to the longitudinal direction of lead parts V12a, 52a to interpose the portions laterally projecting from bases 70, 80 in wide portions 140, 150 so as to bring the projecting portions into contact with each other and pressurize the same.

The fusing nozzles are energized to heat lead parts V12a, 52a to join the opposing surfaces of wide portions 140, 150.

As described above, the present exemplary embodiment allows the fusing nozzles to come into contact with the portions laterally projecting from bases 70, 80 of lead parts V12a, 52a in wide portions 140, 150 and pressurize the projecting portions.

Increase in the number of connecting parts between the coil and the bus bar may lead to failure in securing a space for the fusing nozzles sandwiching from both sides and pressurizing the connecting parts. In such a case, the structure according to the present exemplary embodiment enables displacement of the fusing nozzles to be inserted. This secures the space for joining. As described above, this structure enables application of force from the fusing nozzles with no loss. Wide portions 140, 150 can thus be reliably joined at contact surfaces. Accordingly, coil V12 and bus bar 52 can be connected to each other stably and reliably. This reduces defective connection.

As described above, the connection structure between the coil and the bus bar according to the present exemplary embodiment is applied to a coil and a bus bar attached to a stator of a motor, and the coil and the bus bar have lead parts V12a, 52a, respectively. Lead parts V12a, 52a have the distal ends provided with wide portions 140, 150 including bases 70, 80 and lateral projections from bases 70, 80, respectively. The coil and the bus bar are connected in the state where the projections of wide portions 140, 150 are in contact and overlapped with each other.

This configuration enables application of force necessary for connection between the coil and the bus bar to the opposing surfaces of wide portions 140, 150 where the coil and the bus bar are in contact with each other. The coil and the bus bar can thus be connected to each other stably and reliably. Furthermore, joint surfaces 90 are provided distant from bases 70, 80 to easily secure a space for insertion of a tool such as the fusing nozzles used for joining.

Each of the first and second exemplary embodiments exemplarily describes the connection structure between coil V12 and bus bar 52. The structures and the connection methods described above are obviously applicable to connection between a different coil and a different bus bar.

The first and second exemplary embodiments exemplify joining by fusing for connection between lead parts V12a, 52a. The present disclosure is not particularly limited to this case, but is applicable to a joining process with use of a resistance welder or ultrasonic equipment, or by high-frequency induction heating.

Coils V12 to W41 each including wound wire having a rectangular section achieve increase in space factor of the coils in slots 43 and improvement in efficiency of motor 1. The distal end having the rectangular section of each of the coils may be directly utilized as the lead part. This eliminates formation of the lead parts or attachment of the lead parts.

Coils U11 to U41, V12 to V42, W11 to W41 and bus bars 51 to 54 are each made of a copper material in the first and second exemplary embodiments. The present disclosure is not particularly limited to this case, but the coils and the bus bars may alternatively be made of a different metallic material such as aluminum, zinc, magnesium, brass, iron, SUS, or the like.

The connection structure between the coil and the bus bar in the motor according to the present disclosure reduces defective connection in the motor. The present disclosure is thus useful for achievement of the motor of high reliability.

The invention claimed is:

1. A connection structure configured to connect a coil and a bus bar attached to a stator of a motor, wherein:
   the coil and the bus bar each include a lead part so that the connection structures including lead parts,
   the lead parts are arranged along a straight line extending in a longitudinal direction of the lead parts,
   at least one of the lead parts has a distal end provided with a corner cut away to be stepped to configure a stepped portion having a side surface extending substantially in parallel with the longitudinal direction of the lead parts, and
   the coil and the bus bar are two different elements and directly connected to each other in a state where the side surface of the stepped portion of the one of the lead parts is in contact with another of the lead parts.

2. The connection structure configured to connect the coil and the bus bar according to claim 1, wherein
   each of the lead parts has the distal end provided with the corner cut away to be stepped to configure the stepped portion having the side surface extending substantially in parallel with the longitudinal direction of the lead parts, and
   the coil and the bus bar are directly connected to each other in a state where the side surfaces of the stepped portions are in contact with each other.

3. The connection structure configured to connect the coil and the bus bar according to claim 2, wherein
   each of the lead parts has a bottom surface provided continuously to the side surface in the stepped portion, and a distal end surface of a portion other than the stepped portion at the distal end, and the bottom surface and the distal end surface are provided substantially perpendicularly to the longitudinal direction of the lead parts.

4. The connection structure configured to connect the coil and the bus bar according to claim 3, wherein the distal end surface of the one of the lead parts and the bottom surface of the another one of the lead parts interpose a predetermined gap.

5. A connection structure configured to connect a coil and a bus bar attached to a stator of a motor, wherein:

each of the coil and the bus bar include a lead part, the lead part of the coil and the lead part of the bus bar are arranged along a straight line extending in a longitudinal direction of the lead part of the coil and the lead part of the bus bar, a first one of the lead part of the coil or the lead part of the bus bar has a distal end provided with a protrusion extending in the longitudinal direction, and a second one of the lead part of the coil or the lead part of the bus bar has a distal end provided with a recess to be fitted to the protrusion, and the coil and the bus bar are two different elements and directly connected to each other in a state where the protrusion is fitted to the recess.

6. The connection structure be configured to connect tween the coil and the bus bar according to claim 5, wherein the recess has a prism shape having n corners extending in the longitudinal direction, where n is a natural number more than or equal to three.

7. The connection structure configured to connect the coil and the bus bar according to claim 5, wherein:

the protrusion has a side surface and the recess has an inner surface, each of the side surface and the inner surface being provided in parallel with the longitudinal direction, and the coil and the bus bar are connected to each other in a state where the side surface of the protrusion and the inner surface of the recess are in contact with each other.

8. The connection structure configured to connect the coil and the bus bar according to claim 5, wherein the protrusion has a distal end and the recess has a bottom, the distal end and the bottom interposing a predetermined gap.

9. A connection structure configured to connect a coil and a bus bar attached to a stator of a motor, wherein:

each of the coil and the bus bar include a lead part, the lead part of the coil and the lead part of the bus bar are arranged along a straight line extending in a longitudinal direction of the lead part of the coil and the lead part of the bus bar, each of the lead part of the coil and the lead part of the bus bar has a distal end provided with a wide portion including a base and a lateral projection from the base, and the coil and the bus bar are two different elements and directly connected to each other in a state where the wide portion of the lead part of the coil and the wide portion of the lead part of the bus bar are overlapped with each other with the protrusion of the lead part of the coil and the protrusion of the lead part of the bus bar being in contact with each other.

10. The connection structure configured to connect the coil and the bus bar according to claim 1, wherein the coil includes wire made of a metal selected from copper, aluminum, zinc, magnesium, brass, iron, and steel use stainless (SUS) and having a rectangular section, the lead part of the coil occupies part of the wire, the bus bar is a tabular member, and the lead part of the bus bar is a conductive member having a rectangular section and extending from the tabular member.

11. A motor comprising:

a cover case accommodating a shaft;

a rotor provided in contact with an outer circumference of the shaft; and a stator disposed outside the rotor and constantly spaced apart from the rotor; wherein:

the stator includes a substantially annular stator core, a plurality of teeth provided at equal intervals along an inner circumference of the stator core, slots each provided between the plurality of teeth, a coil attached to each of the plurality of teeth and disposed in a corresponding one of the slots, and a bus bar electrically connected to the coil, and the coil and the bus bar have at least one connecting part having the connection structure according to claim 1.

* * * * *